United States Patent [19]

Sweany

[11] Patent Number: 4,713,654
[45] Date of Patent: Dec. 15, 1987

[54] SHAFT SPEED MONITOR

[76] Inventor: Ralph S. Sweany, R.R. 2, Box 616, Crothersville, Ind. 47229

[21] Appl. No.: 835,253

[22] Filed: Mar. 3, 1986

[51] Int. Cl.⁴ .............................................. G01B 21/00
[52] U.S. Cl. ..................................................... 340/671
[58] Field of Search ....................... 340/671; 200/80 B

[56] References Cited

U.S. PATENT DOCUMENTS

| | | | |
|---|---|---|---|
| 3,611,343 | 10/1971 | Schoenbach | 340/761 |
| 3,739,367 | 6/1973 | Fathauer | 340/761 |
| 3,916,361 | 10/1975 | Hasegawa et al. | 340/761 |
| 3,921,159 | 11/1975 | Steffen | 340/761 |
| 4,538,650 | 9/1985 | Kodama et al. | 242/47.01 |

Primary Examiner—Stewart J. Levy
Assistant Examiner—Hezron E. Williams
Attorney, Agent, or Firm—Woodard, Emhardt, Naughton, Moriarty & McNett

[57] ABSTRACT

An apparatus for monitoring and warning of an undesirable velocity condition in a rotating shaft includes a magnetic reed switch having on and off domains oriented with respect to an actuation magnet which is displaced on an outward radial path with respect to the shaft by centrifugal force, such that the actuation magnet can pass from within an on domain to within an off domain and vice versa, thereby switching the reed switch on and off according to the speed of rotation of the shaft. The reed switch is connected electrically to a warning light or buzzer or control circuit. An alternative embodiment employs a ferromagnetic shield variously interposed between the actuation magnet and the reed switch in response to centrifugal force.

12 Claims, 6 Drawing Figures

SHAFT SPEED MONITOR

BACKGROUND OF THE INVENTION

The present invention involves a monitoring system which is responsive to the angular velocity condition of a rotating member of a machine.

One area where such a monitoring system is particularly useful is in agricultural machines, such as seed planters and combines, which may have one or more shafts whose continued rotation at a specific speed or within a range of speeds is essential to the proper operation and longevity of the machine.

The approaches certain others have taken to monitor the angular velocity of a shaft are shown in U.S. Pat. Nos. 3,611,343 to Schoenbach; 3,739,367 to Fathauer; and 3,921,159 to Steffen. A feature common to the disclosures of these three patents is the provision of a magnetically operable reed switch in proximity with the rotating shaft, and a permanent magnet mounted on the shaft such that the reed switch is actuated by the magnet on each revolution of the shaft. The reed switch, connected to an electrical current source, provides a pulsed DC electrical signal in which the frequency and duration of the pulses varies in accordance with the opening and closing of the reed switch as the shaft rotates. Electrical circuitry is provided to compare the frequency or duration of the signal pulses from the reed switch with a selected frequency or duration which corresponds to a desired shaft rotational speed. Deviation from the desired frequency or duration results in activation of an alarm to indicate to the machine operator that an undesirable shaft speed condition is present.

SUMMARY OF THE INVENTION

A shaft speed monitor for warning of an undesired velocity condition in a rotating shaft includes magnetic means for establishing an actuating magnetic field and an electrical switch having alternate open and closed states, the switch being responsive to the actuating magnetic field and cooperating therewith to define on and off spatial domains wherein the switch is on when the magnetic means is oriented within an on-domain and the switch is off when the magnetic means is oriented within an off-domain. Further provided are mounting means for mounting and orienting the magnetic means and the electrical switch with respect to the shaft to permit displacement by centrifugal force, generated by the rotation of the shaft, of the magnetic means with respect to the electrical switch such that the magnetic means can pass from within an on-domain to within an off-domain. Bias means for biasing the magnetic means within an on-domain when the shaft is at rest and for resisting displacement thereof by centrifugal force are provided. An electrically operated output means operatively connected to the electrical switch generates an output signal representative of the on-off condition of the switch.

In another aspect of the present invention, a shaft speed monitor for warning of an undesired velocity condition in a rotating shaft includes magnetic means for establishing an actuating magnetic field and an electrical switch having alternate open and closed states, said switch being responsive to the actuating magnetic field. A ferromagnetic sheild is also provided. Mounting means are provided for mounting and orienting said magnetic means, said ferromagnetic shield and said electrical switch with respect to said shaft to permit displacement by centrifugal force, generated by the rotation of said shaft, of the ferromagnetic shield so as to be interposed between the electrical switch and the magnetic means in varying degree to modulate the effect of the actuating magnetic field on the electrical switch, thereby causing said switch to change between the on state and the off state in accordance with the degree of interposition of the shield. Bias means for biasing said ferromagnetic shield out of interposition when the shaft is at rest and resisting displacement thereof by centrifugal force are provided. Also included are electrically operated output means operatively connected to said electrical switch for generating an output signal representative of the on-off condition of said switch.

It is an object of the present invention to provide a simple, reliable device for monitoring for an underspeed or overspeed condition in a rotating shaft.

Additional objects and advantages will become apparent from the following descriptions.

DESCRIPTION OF THE PREFERRED EMBODIMENT

Figure 1:
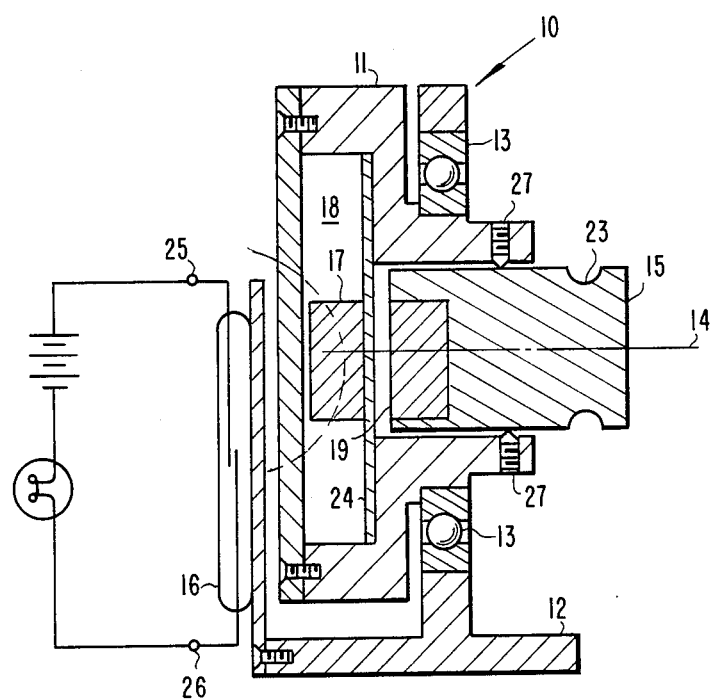
FIG. 1 is an elevational cross sectional view of a shaft speed monitor apparatus made in accordance with the present invention.

For the purposes of promoting an understanding of the present invention, reference will now be made to the embodiment illustrated in the drawings and specific language will be used to describe the same. It is nevertheless to be understood that no limitation of the scope of the invention is thereby intended, the proper scope of the invention being indicated by the claims appended below and the equivalents thereof.

Referring in particular to FIG. 1, there is illustrated an apparatus 10 constructed in accordance with the present invention for monitoring the speed of a rotating shaft, and warning of stoppage or underspeed. Apparatus 10 includes as its principal components a housing 11 mounted with respect to stationary frame 12 by bearing 13 for rotation about axis 14, a drive shaft 15 coaxial with axis 14 in driving engagement with housing 11, a magnetic reed switch 16 mounted to frame 12 adjacent the end face of housing 11 and oriented radially with respect to axis 14, an actuation magnet 17 free floating within a cylindrical cavity 18 of housing 11, and a retention magnet 19 eccentrically mounted within a recess in the end of drive shaft 15.

In use, apparatus 10 would be located in a machine, such as a farm combine, adjacent a rotating shaft, the speed of which is desired to be monitored. Frame 12 would be rigidly mounted to a convenient stationary member of the machine, with an O-ring or other type drive belt being received about a pulley on the monitored shaft (or alternatively, about the shaft itself) and within annular groove 23 of drive shaft 15. The ratio of the monitored shaft pulley to the drive shaft 15 would be selected for speed reduction or increase as may be appropriate for proper operation of apparatus 10 according to the principles discussed further below.

Actuation magnet 17 and retention magnet 19 are found cylindrical "button" permanent magnets having their magnetic poles located on their faces and oriented in the same direction such that actuation magnet 17 is attracted to retention magnet 19. Consequently, so long as housing 11 is at rest, actuation magnet 17 is held against rear wall 24 of cavity 18 in alignment with retention magnet 19. Because retention magnet 19 is mounted eccentrically with respect to axis of rotation 14, rotation of housing 11 will cause a centrifugal force effect upon similarly offset actuation magnet 17, tending to force actuation magnet 17 radially outward as the rotational speed of housing 11 increases. This outward force is offset by a radially inward force due to the mutual magnetic attraction of actuation magnet 17 and retention magnet 19. At some particular rotational speed, the centrifugal force will overcome the magnetic attraction and actuation magnet 17 will break free and slide outwardly along rear wall 24. Upon reduction in speed, the magnetic attraction will eventually overcome the centrifugal force and actuation magnet 17 will again be drawn inward into alignment with retention magnet 19. The speed at which actuation magnet 17 is drawn back in will generally be less than the speed at which it first broke free, this discrepancy being known as hysteresis. To reduce the contribution of friction to this hysteresis, rear wall 24 is made of a low friction plastic material, preferably Teflon.

Reed switch 16 is the conventionally known type having a pair of overlapping metallic ferromagnetic reeds mounted within a hermetically sealed glass tube, with electrical terminals 25 and 26 at opposite ends. The reeds have the property that when placed within a properly oriented magnetic field, both reeds are magnetized with opposite polarity, such that they are attracted together, making electrical contact with each other, and completing the electrical circuit between terminals 25 and 26. For a particular reed switch and a given orientation of actuating magnet, there are three-dimensional "on-domains" and "off-domains" wherein the switch contacts will be closed or open, respectively, upon entry of the actuation magnet within the domains.

In apparatus 10, reed switch 16 is oriented with respect to actuation magnet 17 such that when actuation magnet 17 is aligned with retention magnet 19, it intrudes within an on-domain, and when actuation magnet 17 is disposed at the periphery of cavity 18, its circular path carries it through a off-domains only. Consequently, reed switch 16 is closed whenever the rotational speed of housing 11 drops below the speed at which actuation magnet 17 is drawn back inward by retention magnet 19. Should the shaft stop completely, actuation magnet 17 returns to rest in alignment with retention magnet 19, within an on-domain. Thus, apparatus 10 can be used to warn of an underspeed or stopped shaft, by connecting terminals 25 and 26 in series with an electrical current source and a light, buzzer and/or automatic control device.

It will be noted that the speed at which actuation magnet 17 breaks free of retention magnet 19 is a function of the eccentric offset of retention magnet 19, and the strength of the attractive magnetic force between actuation magnet 17 and retention magnet 19. The eccentric offset must be great enough to provide sufficient centrifugal force at the speed of interest, yet not so great that the eccentric rotation intermittently takes the actuation magnet out of the on-domain. In apparatus 10, the eccentricity is fixed, but the magnetic attractive force is adjustable by adjusting the distance between the two magnets. Drive shaft 15 can be moved axially with respect to housing 11, with set screws 27 holding it in a selected position. Inward disposition of drive shaft 15 (and retention magnet 19) results in a greater actuation speed and outward disposition results in a lesser actuation speed. The retention magnet must not be moved so far away from the actuation magnet that the retention magnet will not always return the actuation magnet to the on-domain when the drive shaft is at rest. Graduated markings could be provided along drive shaft 15 to facilitate repeated settings of apparatus 10 to actuate at particularly selected underspeeds. The hysteresis cannot be readily adjusted in apparatus 10, except as a function of actuation speed.

Housing 11, drive shaft 15, and the portion of frame 12 which supports reed switch 16 are made of non-ferromagnetic material, such as aluminum or plastic, so as to neither influence the behavior of actuation magnet 17 nor shield reed switch 16 from the magnetic field of actuation magnet 17.

Figure 2:
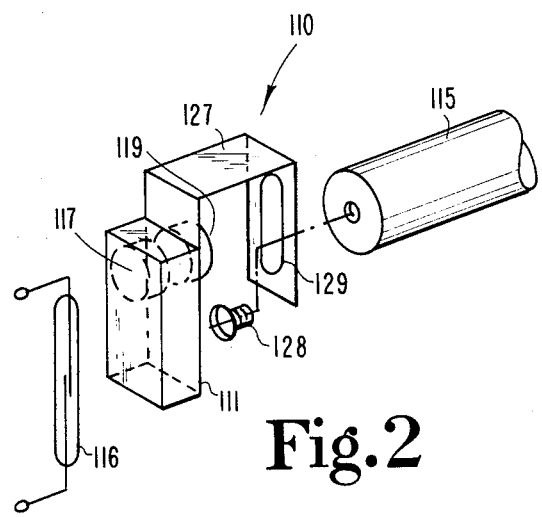
FIG. 2 is a perspective view of an alternative embodiment of a shaft speed monitor apparatus made in accordance with the present invention.

Referring to FIG. 2, there is illustrated an alternative embodiment of the present invention presenting a variation of the general scheme shown in FIG. 1 in which the eccentric offset of the actuation magnet with respect to the axis of rotation is adjustable. Apparatus 110 includes a housing 111 which is essentially a closed rectangular box made of sheet aluminum housing a free floating actuation magnet 117. A retention magnet is fixed to the back of housing 111 such that the actuation magnet 117 is always returned by mutual magnetic attraction into alignment with the retention magnet 119 regardless of the at-rest orientation of housing 111. U-shaped bracket 127 connects housing 111 to the end face of shaft 115 by means of screw 128. An elongated slot 129 in the rear leg of U-shaped bracket 127 permits adjustment of the eccentric offset of retention magnet 119 with respect to the axis of rotation of shaft 115, thereby allowing adjustment of the speed at which actuatioin magnet 117 breaks free of retention magnet 119. Reed switch 116 is fixed in position with respect to shaft 115, which can be the shaft which is to be monitored, or a separate belt driven shaft as in the embodiment of FIG. 1.

Figure 3:
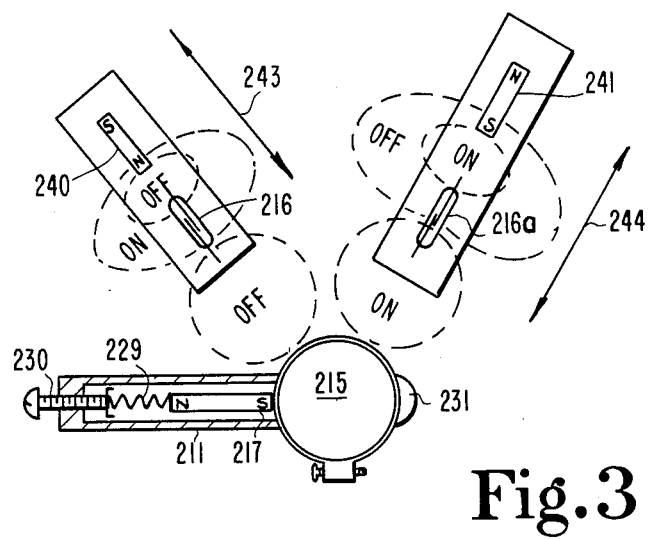
FIG. 3 is an elevational cross sectional view of yet another embodiment of a shaft speed monitor apparatus made in accordance with the present invention.
Figure 4:
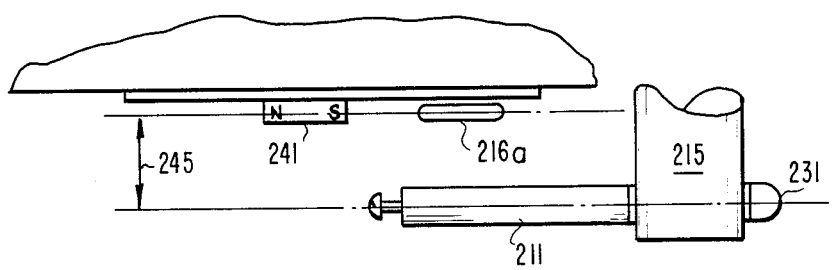
FIG. 4 is a view of the apparatus of FIG. 3 taken along line 4—4.

Referring to FIGS. 3 and 4, there is illustrated yet another embodiment of the present invention which includes features allowing both overspeed and underspeed warning, as well as hysteresis adjustability. Attached to a shaft 215, the speed of which is to be monitored, is a radially oriented non-ferromagnetic tube 211 containing an actuation magnet 217 with radially oriented magnetic poles. Tube 211 is balanced by counterweight 231. Outward radial movement of actuation magnet 217 caused by centrifugal force is resisted by coil spring 229. Adjustment screw 230 provides adjustment of actuation speed by varying the radial position of coil spring 229, and therefore the spring force acting upon actuation magnet 217 for a given radial displacement of actuation magnet 217.

Located radially with respect to shaft 215 are two reed switches 216 and 216a having biasing permanent magnets 240 and 241 mounted along the reed switch centerline opposite the shaft at a position which makes the reed have a memory function. That is, once a domain is magnetically violated by the actuation magnet, the reed stays in that electrical state until the opposite domain is violated. Biasing magnets 240 and 241 are oriented with oppositely directed polarity so that the resulting on-domains and off-domains of reed switches 216 and 216a are reversed with respect to each other. Consequently, one reed switch acts as an overspeed indicator and the other acts as an underspeed indicator. Both reed switches 216 and 216a are offset axially with respect to tube 211 as shown best in FIG. 4. Adjustment of the position of reed switches 216 and 216a in the directions indicated by arrows 243 and 244 in FIG. 3 provides adjustment of the speed of actuation. Adjustment of their positions in the direction indicated by arrow 245 in FIG. 4 provides adjustment of the hysteresis.

With the embodiment shown in FIGS. 3 and 4, there is no provision for indicating sudden stoppage of the shaft in less than one revolution after tube 211 has passed over the underspeed indicating reed switch. Indication in such cases could be provided by mounting tube 211 to shaft 215 with a ratchet mechanism so that sudden stoppage of shaft 215 would result in at least one continued revolution by tube 211 due to inertia, thereby ensuring that it would pass over the reed switch in an underspeed state and the on-domain would be violated by the actuation magnet 217.

By employing permanent magnets (or electromagnets) in various bias positions in association with magnetically actuated reed switches, it is possible to manipulate the size and shape and orientation of the on-domains and off-domains associated with the magnetic switch to permit configurations of a shaft speed monitor other than as shown in the few examples above. One of the primary principles underlying the present invention is that a simple shaft speed monitor can be constructed by providing a permanent magnet which is movable along a radial path with respect to the rotating shaft, wherein the radial position is a function of centrifugal force acting upon the magnet caused by rotation of the shaft. A magnetic switch is provided having on-domains and off-domains oriented with respect to the shaft such that the magnet can pass from within one domain to within the other as it traverses its radial path.

An additional feature of this shaft speed monitor is that it will also warn of shaft bearing failure. In the embodiments of FIGS. 1 and 2, as the monitored shaft bearing deteriorates the shaft will wobble in adversely affecting drive belt tension to the monitor device and eventually give an underspeed warning. In the case of the FIG. 3 embodiment, as the monitored shaft bearing deteriorates the shaft wobble will send the actuation magnet in ever widening circles until eventually a domain violation will occur which is not of the standard case, thus warning the operator.

A key principle underlying the present invention is that a shaft speed monitor can be simply made without complicated electronic circuitry as required by previous art by providing a magnetically actuated switch which senses an actuating magnetic flux, the strength of which is proportional to centrifugal force generated by the rotating shaft. Many differently configured monitors can be made using this concept. For instance, the actuating magnetic flux source and the magnetically actuated switch can be arranged to be physically displaced from one another by centrifugal force acting against a biasing force, such as might be provided by compression of springs, gasses, or other resilient materials, or by oppositely oriented magnetic fields. Alternatively, the the action of the actuating magnetic flux upon the magnetically actuated switch can be manipulated by a ferromagnetic shield interposed between the flux source and the switch in varying degree sympathetic to centrifugal force generated by the rotating shaft. Other means for manipulating the action of a magnetic flux upon a magnetically actuated switch in proportion to centrifugal force will be apparent to those skilled in the art.

Figure 5:
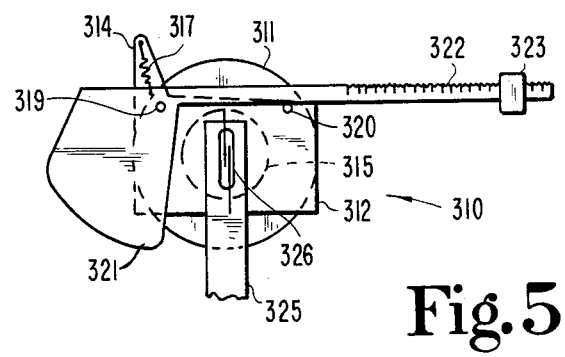
FIG. 5 is a front elevational view of another alternative embodiment of a shaft speed monitor apparatus made in accordance with the present invention.
Figure 6:
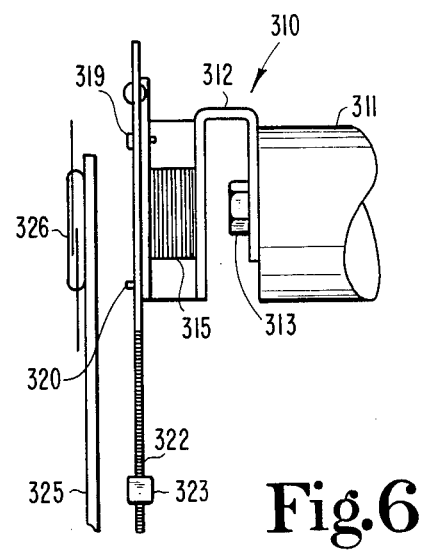
FIG. 6 is a side elevational view of the apparatus of FIG. 5.

An alternative embodiment applying the above principles is illustrated in FIGS. 5 and 6. Apparatus 310 includes a rotating shaft 311 to which is mounted a non-ferromagnetic bracket 312 by means of bolt 313. Bracket 312 rotates with shaft 311. Bracket 312 includes projecting arm 314 and actuation magnet 315 is rigidly mounted thereto concentric with shaft 311. Attached to bracket 312 is tension spring 317, pivot pin 319, and stop pin 320. Ferromagnetic shield 321 is pivotally mounted on pivot pin 319, and includes a graduated arm 322 and a moveable weight 323. Shield 321 is moveable from the at-rest position shown in FIG. 5, against the biasing force of spring 317 so as to interpose the shield between magnet 315 and reed switch 326, which is mounted on support 325 so as to remain stationary with respect to the shaft. The degree of interposition of shield 321 is determined by the speed of rotation of shaft 311, which causes weighted arm 322 to move outwardly under the influence of centrifugal force and pivot shield 321 about pin 319. By moving weight 323 along arm 322, the actuation speed of the apparatus 310 can be adjusted.

While the preferred embodiment of the invention has been illustrated and described in some detail in the drawings and foregoing description, it is to be understood that this description is made only by way of example to set forth the best mode contemplated of carrying out the invention and not as a limitation to the scope of the invention which is pointed out in the claims below.

What I claims is:

1. A shaft speed monitor for warning of an undesired velocity condition in a rotating shaft having an axis of rotation, comprising:

magnetic means for establishing an actuating magnetic field, the poles of said magnetic means defining an axis of magnetic polarity;

an electrical switch having alternate open and closed states, said switch being responsive to the actuating magnetic field and cooperating therewith to define on and off spatial domains wherein said switch is on when said magnetic means is oriented within an on-domain and said switch is off when said magnetic means is oriented within an off-domain;

mounting means for mounting and orienting said magnetic means and said electrical switch with respect to said shaft to permit displacement by centrifugal force, generated by the rotation of said shaft, of the magnetic means with respect to the electrical switch such that said magnetic means can pass from within an on-domain to within an off-domain, in which the axis of magnetic polarity of said magnetic means is parallel to the axis of rotation of said shaft;

bias means for biasing said magnetic means within an on-domain when the shaft is at rest and for resisting displacement thereof by centrifugal force; and electrically operated output means operatively connected to said electrical switch for generating an output signal representative of the on-off condition of said switch.

2. The shaft speed monitor of claim 1, in which the biasing means includes magnetic retention means having mutual magnetic attraction with said magnetic means.

3. The shaft speed monitor of claim 2, and further including means for adjusting the strength of mutual magnetic attraction between said magnetic retention means and said magnetic means, thereby providing actuation speed adjustment.

4. The shaft speed monitor of claim 3, in which the means for adjusting includes means for selectively altering the at-rest spacing between the magnetic retention means and the magnetic means.

5. The shaft speed monitor of claim 1, in which the biasing means includes resilient spring means.

6. The shaft speed monitor of claim 5, and further including means for adjusting the force of the biasing resilient spring means, thereby providing actuation speed adjustment.

7. The shaft speed monitor of claim 2, and further including means for mounting said magnetic retention means to be rotatably driven by said shaft about an axis of rotation, said magnetic retention means being eccentrically mounted with respect to the axis of rotation.

8. The shaft speed monitor of claim 7, in which said magnetic means is mounted with respect to the axis of rotation so as to be axially adjacent the magnetic retention means while at rest, and radially displaced therefrom by centrifugal force generated by eccentric rotation about the axis of rotation which exceeds the mutual attractive force therebetween.

9. A shaft speed monitor for warning of an undesired velocity condition in a rotating shaft, comprising:
   magnetic means for establishing an actuating magnetic field;
   an electrical switch having alternate open and closed states, said switch being responsive to the actuating magnetic field and cooperating therewith to define on and off spatial domains wherein said switch is on when said magnetic means is oriented within an on-domain and said switch is off when said magnetic means is oriented within an off-domain;
   mounting means for mounting and orienting said magnetic means and said electrical switch with respect to said shaft to permit displacement by centrifugal force, generated by the rotation of said shaft, of the magnetic means with respect to the electrical switch such that said magnetic means can pass from within an on-domain to within an off-domain;
   bias means for biasing said magnetic means within an on-domain when the shaft is at rest and for resisting displacement thereof by centrifugal force, including magnetic retention means having mutual magnetic attraction with said magnetic means;
   means for adjusting the strength of mutual magnetic attraction between the magnetic retenion means and said magnetic means, thereby providing actuation speed adjustment; and
   electrically operated output means operatively connected to said electrical switch for generating an output signal representative of the on-off condition of said switch.

10. The shaft speed monitor of claim 9, in which the means for adjusting includes means for selectively altering the at-rest spacing between the magnetic retention means and the magnetic means.

11. A shaft speed monitor for warning of an undesired velocity condition in a rotating shaft having an axis of rotation, comprising:
   magnetic means for establishing an actuating magnetic field;
   an electrical switch having alternate open and closed states, said switch being responsive to the actuating magnetic field and cooperating therewith to define on and off spatial domains wherein said switch is on when said magnetic means is oriented within an on-domain and said switch is off when said magnetic means is oriented within an off-domain;
   mounting means for mounting and orienting said magnetic means and said electrical switch with respect to said shaft to permit displacement by centrifugal force, generated by the rotation of said shaft, of the magnetic means with respect to the electrical switch such that said magnetic means can pass from within an on-domain to within an off-domain;
   bias means for biasing said magnetic means within an on-domain when the shaft is at rest and for resisting displacement thereof by centrifugal force, including magnetic retention means having mutual magnetic attraction with said magnetic means;
   means for mounting said magnetic retention means to be rotatably driven by said shaft about said axis of rotation, said magnetic retention means being eccentrically mounted with respect to said axis of rotation; and
   electrically operated output means operatively connected to said electrical switch for generating an output signal representative of the on-off condition of said switch.

12. The shaft speed monitor of claim 11, in which said magnetic means is mounted with respect to the axis of rotation so as to be axially adjacent the magnetic retention means while at rest, and radially displaced therefrom by centrifugal force generated by eccentric rotation about the axis of rotation which exceeds the mutual attractive force therebetween.

* * * * *